O. E. BURGOON.
SHOCK ABSORBER.
APPLICATION FILED JULY 7, 1920.

1,424,983.

Patented Aug. 8, 1922.

WITNESSES

Oliver E. Burgoon INVENTOR.

BY

ATTORNEY.

UNITED STATES PATENT OFFICE.

OLIVER E. BURGOON, OF TOLEDO, OHIO.

SHOCK ABSORBER.

1,424,983.   Specification of Letters Patent.   Patented Aug. 8, 1922.

Application filed July 7, 1920. Serial No. 394,409.

*To all whom it may concern:*

Be it known that I, OLIVER E. BURGOON, a citizen of the United States, residing at Toledo, in the county of Lucas and State of Ohio, have invented certain new and useful Improvements in Shock Absorbers, of which the following is a specification.

This invention relates to new and useful improvements in bicycle shock absorbers, the primary object of the invention being to provide means for obviating the unpleasant vibrations of a vehicle caused by the same encountering rough and uneven surfaces.

An important object of the invention is to provide a device of this nature which provides for the mounting of the wheel forwardly of the forks so as to cause the expansion of spring means upon upward movement of the wheel.

Another object of the invention is to provide, strong, durable and efficient means for pivotally connecting the wheel mountings to the forks and which are of such construction as to warrant easy and speedy removal of the mountings from the forks when occasion demands.

Another object of the invention is to provide resilient mounting means for the wheel including a coiled spring and a clip for securing the spring to the fork, the construction of the clip being such so as to prevent the spring from scratching or marring the bicycle.

Other objects and advantages of the invention will become apparent during the course of the following description.

Figure 1:
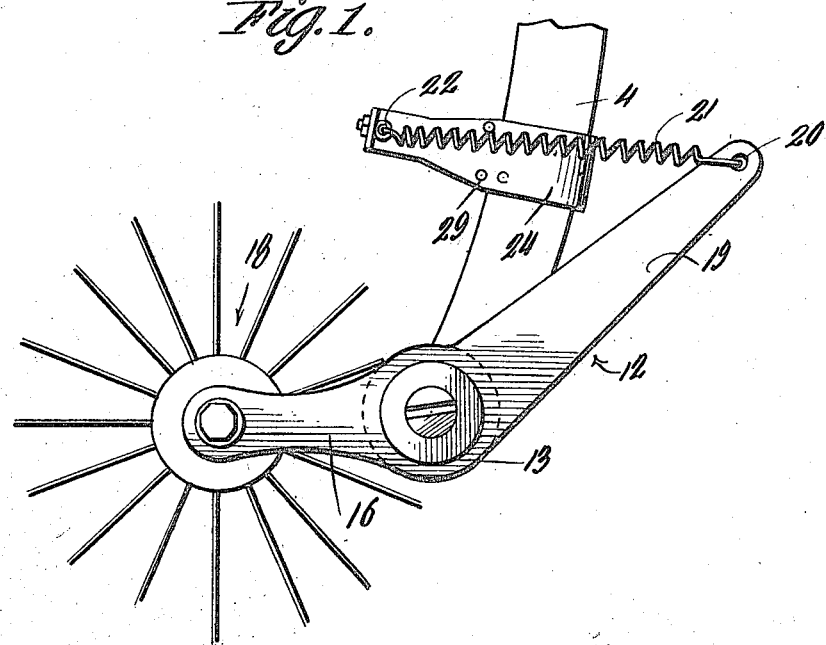

In the accompanying drawings forming a part of the application and wherein like numerals are employed to designate like parts throughout the several views Figure 1 is a side elevation of the invention applied to a bicycle.

Figure 2:
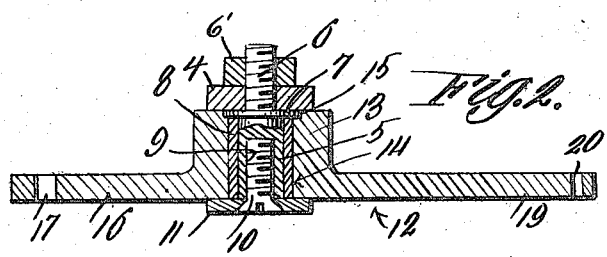
Figure 3:
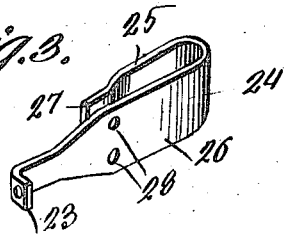

Figure 2 is a longitudinal section through the wheel mounting forming a part of the application, and Figure 3 is a perspective view of one of the clips employed for fastening the springs to the forks.

Referring to the drawings wherein for the purpose of illustration is shown the preferred embodiment of the invention, the numeral 4 designates one of the ordinary pair of the front forks of a bicycle, and inasmuch as similar parts of the invention illustrated are associated with the other fork, a description of the invention associated with one fork will suffice for both. A bolt 5 has its inner end 6 reduced and threaded for reception in the opening in the lower end of the fork 4 and a nut, 6' shown in Figure 2, is threaded upon the reduced portion of the bolt for securing the same to the fork. Between the ends of the bolt I provide a circular flange 7. A bushing 8 is slipped over the bolt 5, the inner ends of the bushing abutting with the flange 7. The outer end of the bolt 5 is equipped with an axially extending threaded opening 9, into which is received a screw 10, which together with the washer 11 provides what I term as a removable abutment. As clearly seen in Figure 2, the washer 11 is provided with a countersunk opening whereby the head of the screw 10 will be flush with the outer surface of the washer 11 to present a neat finish. It will of course be obvious that the screw 10 and washer 11 may be replaced with a bolt having an enlarged head, and it will be seen that the outer end of the bushing 8 abuts with the washer and is thereby prevented from accidental displacement from the bolt 5.

A wheel mounting or rocker arm 12 is provided between its ends with a laterally and transversely enlarged portion 13 which is provided with an opening 14 whereby the rocker arm may be mounted upon the bushing 8 and pivotally associated with a fork. The inner end of the opening 14 is enlarged to receive the flange 7 of the bolt and consequently inward movement of the rocker arm upon the bolt is prevented. It will of course be understood that the washer 11 engages a portion of the outer surface of the rocker arm 12 to prevent accidental displacement of the rocker arm from the bolt.

When in a normal position with relation to the fork, the short arm 16 of the rocker arm extends forwardly of the forks and is disposed in approximately a horizontal plane. The forward end of the arm 16 is provided with an aperture 17 through which extends the axle of the front wheel 18, a portion of which is illustrated. The relative long arm 19 of the rocker arm extends rearwardly of the fork and upwardly thereof at approximately an angle of 45°, the rearmost end being equipped with an aperture for the reception of one end of a coiled spring 21, the forward end of which is connected by an eye-bolt 22 to the apertured laterally extending free end 23 of a clip 24.

The clip 24 is provided by bending one end of a strip of resilient material upon itself to provide a pair of arms 25 and 26, the latter being extended beyond the former and provided with a laterally projecting end 23; the free end of the arms 25 being offset to dispose its free end 27 in proximity to the arm 26. Both the free end 27 of the clip and the intermediate portion of the arm 26 are each provided with a pair of apertures 28 through which rivets 29 are adapted to extend to cause the arms of the clips to securely embrace the fork of the bicycle.

From the foregoing it will be obvious that when the wheel encounters the high portion of the roadway it will move upwardly to swing the long arm 19 of the rocker arm rearwardly, thereby tensioning the coiled spring 21. After the wheel has passed over the portion, the coiled spring will contract and dispose the wheel in its normal position. It will of course be understood that the coiled spring is of sufficient strength to form a resilient connection between the fork and the rocker arm, for in reality the spring 21 sustains the weight of the vehicle and the party occupying the same.

The foregoing description and the accompanying drawings have reference to the preferred or approved embodiment of my invention but it is to be understood that I may make such changes in construction and arrangement of parts, materials, dimensions, etc., as may prove expedient and fall within the scope of the appended claims.

Having thus fully described my invention what I claim as new and desire to secure by Letters Patent is:—

1. The combination with a bicycle fork and a wheel, of a bolt secured to the fork and having a threaded opening in its outer end, shoulders between the end of the bolt, a wheel mounting on the bolt and engaging said shoulders, a washer for the bolt, a screw threaded into the opposite end of the bolt for retaining the washer, and spring means for resisting vibrations of the wheel.

2. The combination with a bicycle fork and wheel, of a wheel mounting for the fork, a spring clip bent upon itself to embrace the fork and having one arm extended forwardly, the free end of said arm being bent laterally and apertured, and a coiled spring having one end connected with said apertured end and its opposite end fastened to said wheel mounting.

In testimony whereof I affix my signature in presence of two witnesses.

OLIVER E. BURGOON.

Witnesses:
MITCHEL AUBRY,
CHARLES H. STEINMILLER.